US012052723B2

United States Patent
Sun et al.

(10) Patent No.: US 12,052,723 B2
(45) Date of Patent: Jul. 30, 2024

(54) USER EQUIPMENT (UE) ASSISTED UPLINK (UL) TRANSMISSION

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 17/376,037

(22) Filed: Jul. 14, 2021

(65) Prior Publication Data

US 2022/0039145 A1 Feb. 3, 2022

Related U.S. Application Data

(60) Provisional application No. 63/057,689, filed on Jul. 28, 2020.

(51) Int. Cl.
| | |
|---|---|
| *H04W 72/14* | (2009.01) |
| *H04L 1/18* | (2023.01) |
| *H04L 1/1812* | (2023.01) |
| *H04W 72/04* | (2023.01) |
| *H04W 72/21* | (2023.01) |
| *H04W 72/23* | (2023.01) |
| *H04W 92/18* | (2009.01) |

(52) U.S. Cl.
CPC ........... *H04W 72/23* (2023.01); *H04L 1/1819* (2013.01); *H04W 72/21* (2023.01); *H04W 92/18* (2013.01)

(58) Field of Classification Search
None
See application file for complete search history.

(56) References Cited

U.S. PATENT DOCUMENTS

| | | | | |
|---|---|---|---|---|
| 2012/0252354 | A1* | 10/2012 | Itoh | ........................ H04W 48/16 455/7 |
| 2013/0322321 | A1* | 12/2013 | Zhang | ................... H04L 1/0076 370/315 |
| 2015/0085796 | A1* | 3/2015 | Xu | ........................ H04L 1/1819 370/329 |
| 2016/0037466 | A1* | 2/2016 | Yang | ............. H04W 36/008375 370/350 |
| 2016/0050049 | A1* | 2/2016 | Yang | ........................ H04L 1/08 370/329 |
| 2017/0353819 | A1* | 12/2017 | Yin | .................... H04W 72/1284 |
| 2018/0054755 | A1* | 2/2018 | Lee | ........................ H04W 84/04 |
| 2018/0234163 | A1* | 8/2018 | Yasukawa | ............. H04W 16/26 |
| 2018/0255499 | A1* | 9/2018 | Loehr | .................... H04W 76/23 |
| 2019/0254067 | A1* | 8/2019 | Al-Imari | ............... H04L 1/1887 |
| 2020/0221310 | A1* | 7/2020 | Babaei | ............. H04L 27/26025 |
| 2020/0221428 | A1* | 7/2020 | Moon | .................... H04B 7/024 |
| 2020/0267025 | A1* | 8/2020 | Yu | ........................ H04L 5/0051 |
| 2020/0344012 | A1* | 10/2020 | Karaki | .................. H04L 1/1861 |

(Continued)

*Primary Examiner* — Steve R Young
(74) *Attorney, Agent, or Firm* — Seyfarth Shaw LLP

(57) ABSTRACT

A method of wireless communication performed by a first user equipment (UE) includes receiving second data from a remote UE and receiving an uplink transmission grant from a base station. The method also includes generating a payload comprising the second data from the second UE or first data from the first UE. The method additionally transmits the payload to the base station via an uplink resource identified in the uplink transmission grant.

26 Claims, 9 Drawing Sheets

(56) References Cited

U.S. PATENT DOCUMENTS

| | | | | |
|---|---|---|---|---|
| 2020/0367265 A1* | 11/2020 | Wang | .................... | H04L 5/0055 |
| 2021/0152317 A1* | 5/2021 | Li | ......................... | H04L 1/1861 |
| 2021/0298045 A1* | 9/2021 | Kim | .................. | H04W 74/0808 |
| 2021/0368417 A1* | 11/2021 | Luo | ....................... | H04W 76/20 |
| 2021/0376959 A1* | 12/2021 | Yang | ..................... | H04L 1/1896 |
| 2022/0022210 A1* | 1/2022 | Park | .................... | H04W 72/566 |
| 2022/0030493 A1* | 1/2022 | Hong | ................ | H04W 72/0446 |
| 2022/0095351 A1* | 3/2022 | Baldemair | ............ | H04L 1/1822 |
| 2022/0376840 A1* | 11/2022 | Han | ..................... | H04L 1/1819 |

\* cited by examiner

USER EQUIPMENT (UE) ASSISTED UPLINK (UL) TRANSMISSION

CROSS-REFERENCE TO RELATED APPLICATION

The present application claims the benefit of U.S. Provisional Patent Application No. 63/057,689, filed on Jul. 28, 2020, and titled "USER EQUIPMENT (UE) ASSISTED UPLINK (UL) TRANSMISSION," the disclosure of which is expressly incorporated by reference in its entirety.

FIELD OF THE DISCLOSURE

Aspects of the present disclosure generally relate to wireless communications, and more particularly to techniques and apparatuses for user equipment (UE) assisted uplink (UL) transmission.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communications systems may include or provide support for various types of communications systems, such as vehicle related communications systems (e.g., vehicle-to-everything (V2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, sidelink UEs, such as vehicles, may communicate directly with each other using device-to-device (D2D) communications over a D2D wireless link. These communications can be referred to as sidelink communications.

As the demands for sidelink communications increase, different V2X communications systems compete for the same wireless communications resources. Moreover, some sidelink UEs may be power limited. Accordingly, there is a need to improve the efficiency of sidelink wireless communications.

SUMMARY

In aspects of the present disclosure, a method of wireless communication performed by a first user equipment (UE) includes receiving second data from a second UE. The method further includes receiving, from a base station, an uplink transmission grant. The method further includes generating a payload that includes the second data from the second UE or first data from the first UE. The method still further includes transmitting the payload to the base station via an uplink resource identified in the uplink transmission grant.

Other aspects of the present disclosure are directed to an apparatus for wireless communications performed by a first user equipment (UE) having a processor, memory coupled with the processor and instructions stored in the memory. When the instructions are executed by the processor, the apparatus receives second data from a second UE. The apparatus also receives, from a base station, an uplink transmission grant. The apparatus also generates a payload comprising the second data from the second UE or first data from the first UE. The apparatus further transmits the payload to the base station via an uplink resource identified in the uplink transmission grant.

In other aspects of the present disclosure, a method of wireless communication performed by a base station includes receiving a message from a first user equipment (UE) via uplink resources dynamically granted or configured for the first UE. The method further includes decoding uplink control information (UCI) included in the message. The method still further includes determining whether a payload of the message comprises first data generated by the first UE or second data generated by a second UE, based on the decoded UCI.

Other aspects of the present disclosure are directed to an apparatus for wireless communications performed by a base station having a processor, memory coupled with the processor, and instructions stored in the memory. When the instructions are executed by the processor, the apparatus receives a message from a first user equipment (UE) via uplink resources dynamically granted or configured for the first UE. The apparatus further decodes uplink control information (UCI) included in the message. The apparatus also determines whether a payload of the message comprises first data generated by the first UE or second data generated by a second UE, based on the decoded UCI.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
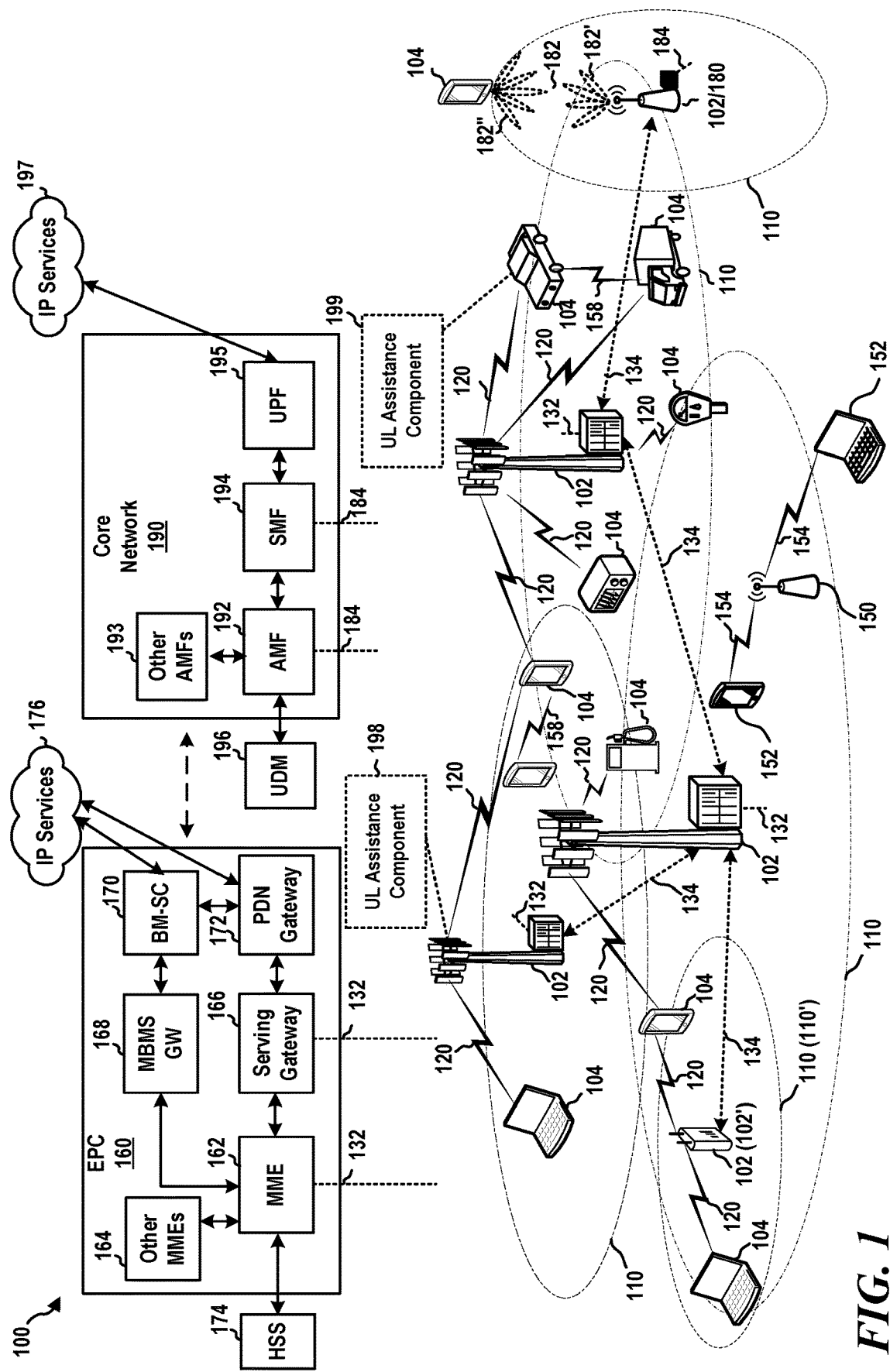
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications may avoid the overhead involving the routing to and from the base station. Therefore, D2D communications may improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (e.g., light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

In conventional cellular communication systems, a base station and a user equipment (UE) exchange data messages and control information. In some cases, two or more UEs may directly communicate with each other via a sidelink channel. When coverage of a UE is limited, the limited coverage UE may use the sidelink channel to exchange data messages and/or control information with the base station. Aspects of the present disclosure are directed to improving communication with a base station by using a first UE to act as a relay to transmit information received from a second UE.

In one configuration, a first UE may be configured as a relay UE or a retransmission UE. For ease of explanation, the first UE will be referred to as the relay UE. The relay UE may communicate with a second UE via a sidelink channel. Additionally, the relay UE may communicate with a base station via uplink and downlink channels, such as uplink/downlink shared channels and uplink/downlink control channels.

In some implementations, the relay UE receives a message from the second UE. The message may include data or control information. The relay UE may generate a payload of a message intended for the base station to include the data (e.g., second data) received from the second UE or data (e.g., first data) generated by the relay UE. The relay UE may then transmit the payload to the base station via an uplink resource identified in an uplink transmission grant received at the relay UE.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (e.g., 3 GHz-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a first UE, such as the UE 104, may include an uplink (UL) assistance component 199 configured to receive an uplink transmission grant from a base station, such as the base station 102. The UL assistance component 199 is also configured to receive second data from a second UE, such as another UE 104. The UL assistance component 199 is further configured to determine whether a payload comprises the second data or first data generated by the first UE. The UL assistance component 199 is also configured to transmit the payload to the base station via an uplink resource identified in the uplink transmission grant.

Although the following description may be focused on 5G NR, it may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology n, there are 14 symbols/slot and 2µ slots/subframe. The subcarrier spacing and symbol length/duration are a function of the numerology. The subcarrier spacing may be equal to $2^\mu*15$ kHz, where n is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment/negative acknowledgment (ACK/NACK) feedback. The PUSCH carries data, and may additionally be used to carry a buffer status report (BSR), a power headroom report (PHR), and/or UCI.

Figure 3:
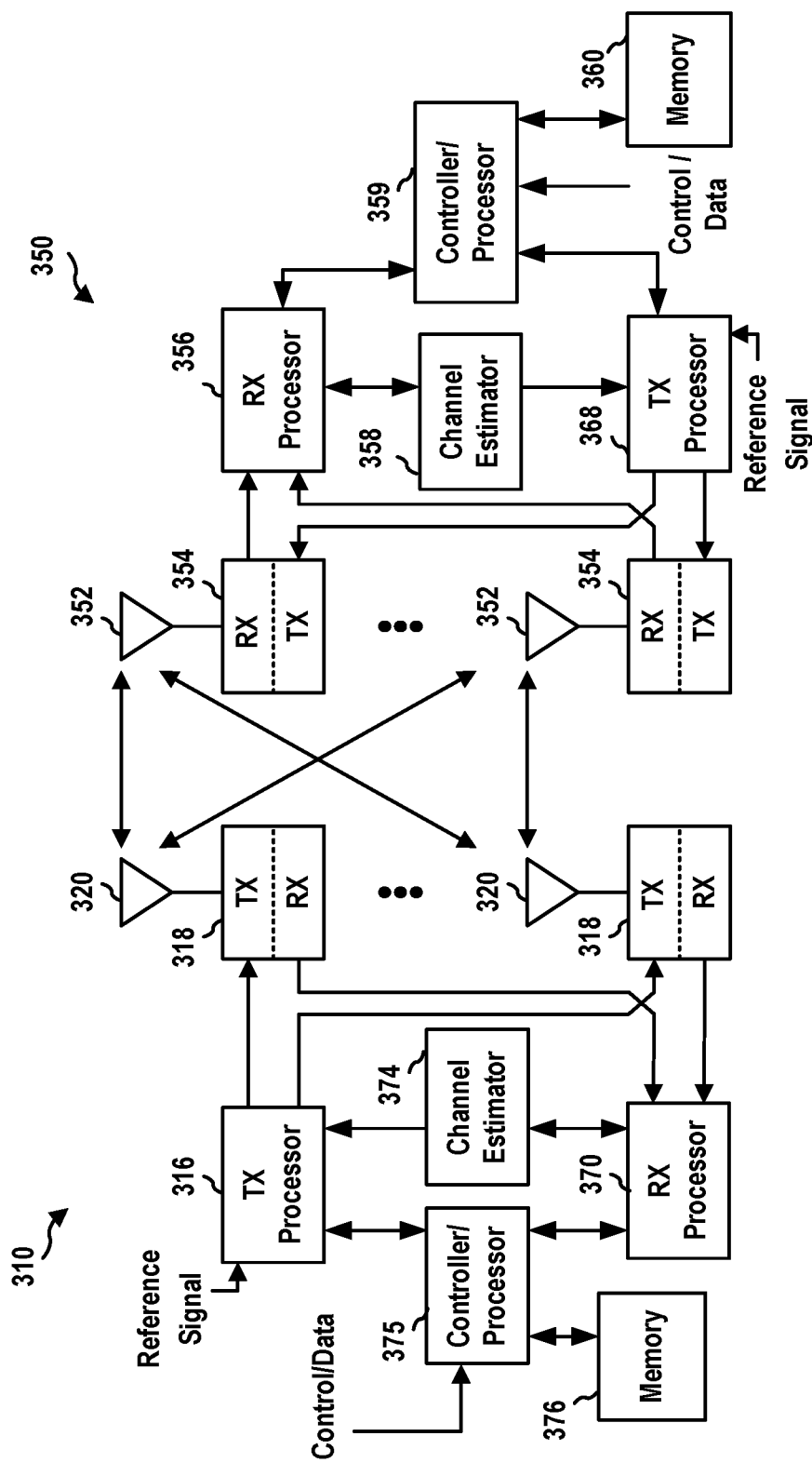
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the uplink (UL) assistance component 199 of FIG. 1. The uplink (UL) assistance component 199 may receive second data from a second UE, and receive, from a base station, an uplink transmission grant. The uplink (UL) assistance component 199 may also generate a payload that includes the second data from the second UE or first data from the first UE, and transmit the payload to the base station via an uplink resource identified in the uplink transmission grant.

At least one of the TX processor 316, the RX processor 370, and the controller/processor 375 may be configured to perform aspects in connection with the uplink (UL) assistance component 198 of FIG. 1. The UL assistance component may receiving a message from a first user equipment (UE) via uplink resources dynamically granted or configured for the first UE, and may decode uplink control information (UCI) included in the message. The UL assistance component may also determine whether a payload of the message comprises first data generated by the first UE or second data generated by a second UE, based on the decoded UCI.

Figure 4:
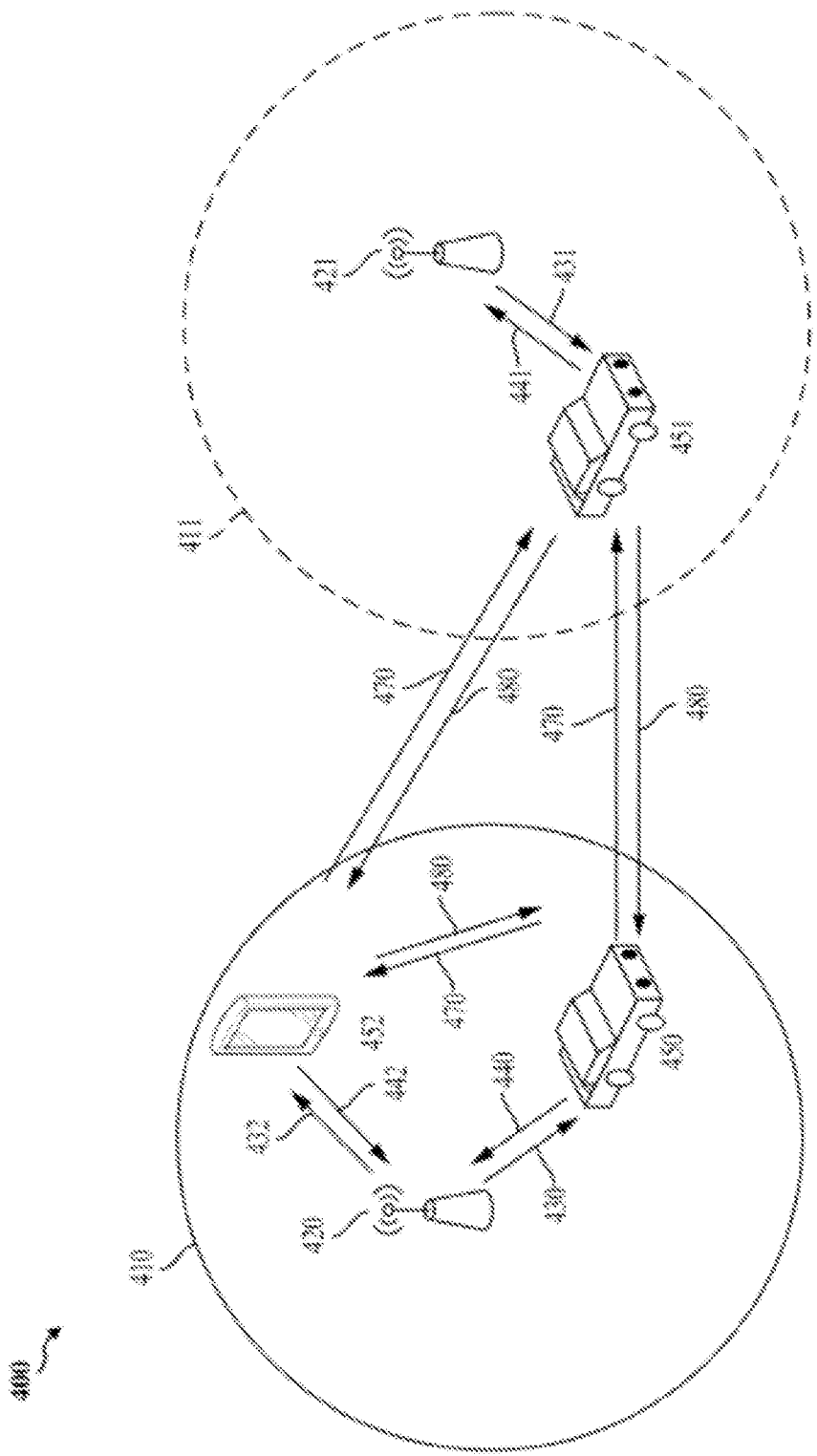
FIG. 4 is a diagram illustrating an example of a vehicle-to-everything (V2X) system, in accordance with various aspects of the present disclosure.

FIG. 4 is a diagram of a device-to-device (D2D) communications system 400, including V2X communications, in accordance with various aspects of the present disclosure. For example, the D2D communications system 400 may include V2X communications, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (e.g., V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among UEs 450, 451 is not scheduled by MNOs. The D2D communications system 400 may further include a third UE 452.

The third UE 452 may operate on the first network 410 (e.g., of the first MNO) or another network, for example. The third UE 452 may be in D2D communications with the first UE 450 and/or second UE 451. The first base station 420 (e.g., gNB) may communicate with the third UE 452 via a downlink (DL) carrier 432 and/or an uplink (UL) carrier 442. The DL communications may be use various DL resources (e.g., the DL subframes (FIG. 2A) and/or the DL channels (FIG. 2B)). The UL communications may be performed via the UL carrier 442 using various UL resources (e.g., the UL subframes (FIG. 2C) and the UL channels (FIG. 2D)).

Figure 2:
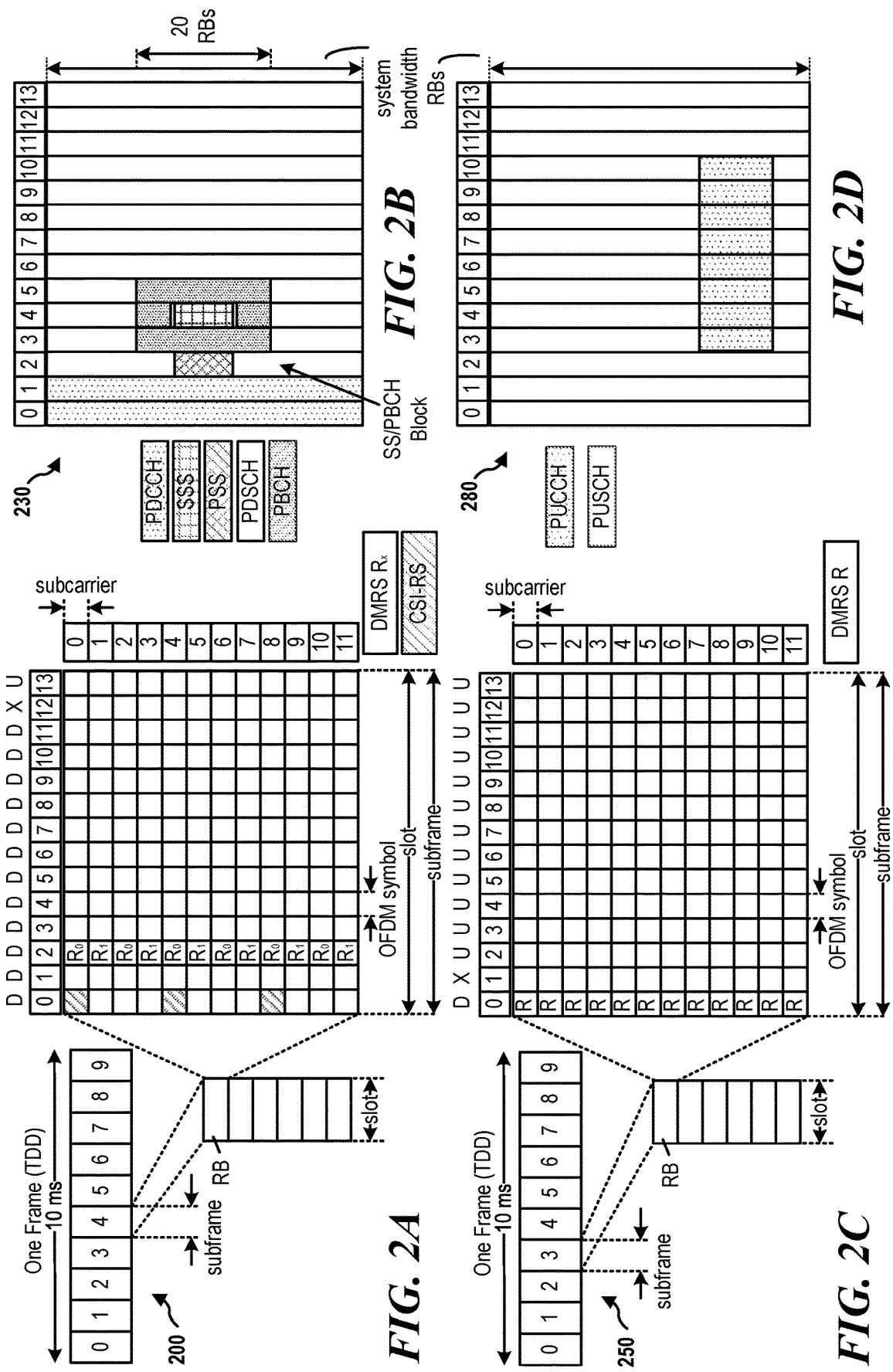
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or an UL carrier 440. The DL communications may be use various DL resources (e.g., the DL subframes (FIG. 2A) and/or the DL channels (FIG. 2B)). The UL communications may be performed via the UL carrier 440 using various UL resources (e.g., the UL subframes (FIG. 2C) and the UL channels (FIG. 2D)).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 (e.g., gNB) communicating with the second UE 451, for example, as described in FIGS. 1-3.

The second base station 421 may communicate with the second UE 451 via a DL carrier 431 and an UL carrier 441. The DL communications are performed via the DL carrier 431 using various DL resources (e.g., the DL subframes (FIG. 2A) and/or the DL channels (FIG. 2B)). The UL communications are performed via the UL carrier 441 using various UL resources (e.g., the UL subframes (FIG. 2C) and/or the UL channels (FIG. 2D)).

In conventional systems, the first base station 420 and/or the second base station 421 assign resources to the UEs for device-to-device (D2D) communications (e.g., V2X communications and/or V2V communications). For example, the resources may be a pool of UL resources, both orthogonal (e.g., one or more frequency division multiplexing (FDM) channels) and non-orthogonal (e.g., code division multiplexing (CDM)/resource spread multiple access (RSMA) in each channel). The first base station 420 and/or the second base station 421 may configure the resources via the PDCCH (e.g., faster approach) or RRC (e.g., slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (e.g., V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communications with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452).

The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (e.g., a first UE 450, a second UE 451, and/or a third UE 452). As discussed, a UE may be a vehicle (e.g., UE 450, 451), a mobile device (e.g., 452), or another type of device. In some cases, a UE may be a special UE, such as a road side unit (RSU).

Figure 5:
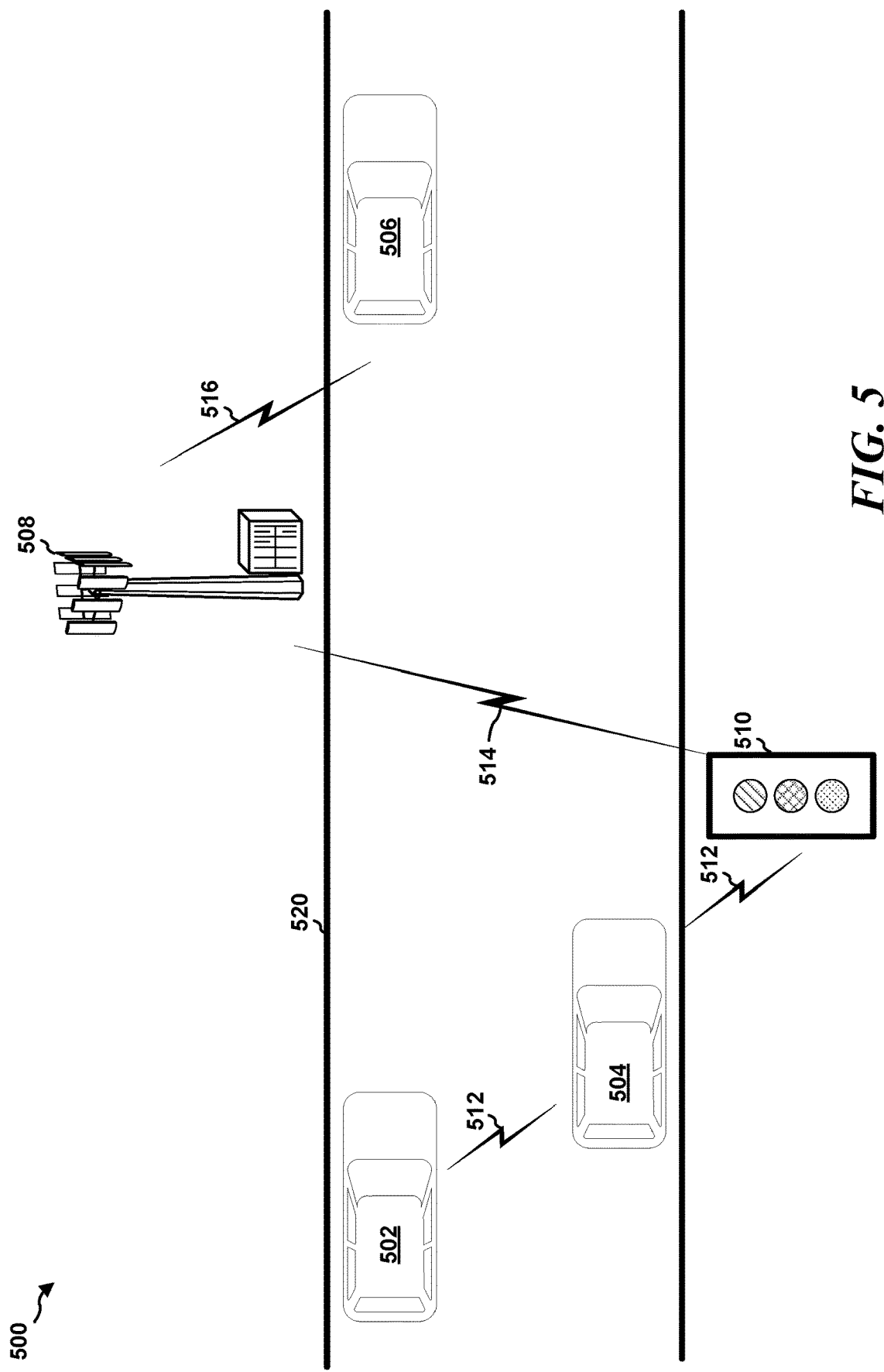
FIG. 5 is a block diagram illustrating an example of a vehicle-to-everything (V2X) system with a road side unit (RSU), according to aspects of the present disclosure.

FIG. 5 illustrates an example of a V2X system 500 with an RSU 510 according to aspects of the present disclosure. As shown in FIG. 5, a transmitter UE 504 transmits data to an RSU 510 and a receiver UE 502 via sidelink transmissions 512. Additionally, or alternatively, the RSU 510 may transmit data to the transmitter UE 504 via a sidelink transmission 512. The RSU 510 may forward data received from the transmitter UE 504 to a cellular network (e.g., gNB) 508 via an UL transmission 514. The gNB 508 may transmit the data received from the RSU 510 to other UEs 506 via a DL transmission 516. The RSU 510 may be incorporated with traffic infrastructure (e.g., traffic light, light pole, etc.) For example, as shown in FIG. 5, the RSU 510 is a traffic signal positioned at a side of a road 520. Additionally or alternatively, RSUs 510 may be stand-alone units.

Figure 6:
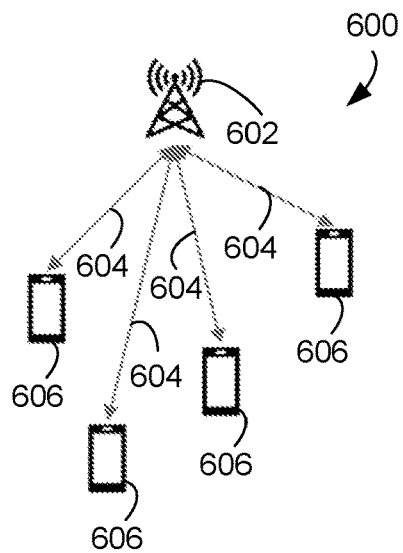
FIG. 6 is a diagram illustrating an example of a cellular communication system.

In some cellular communication systems, a base station and a user equipment (UE) exchange data messages and control information. FIG. 6 illustrates an example of a cellular communication system 600. As shown in FIG. 6, a base station 602 establishes a different communication channel 604 with each UE 606. As such, each UE 606 exchanges data messages and control information with the base station 602 via a respective communication channel 604.

Figure 7:
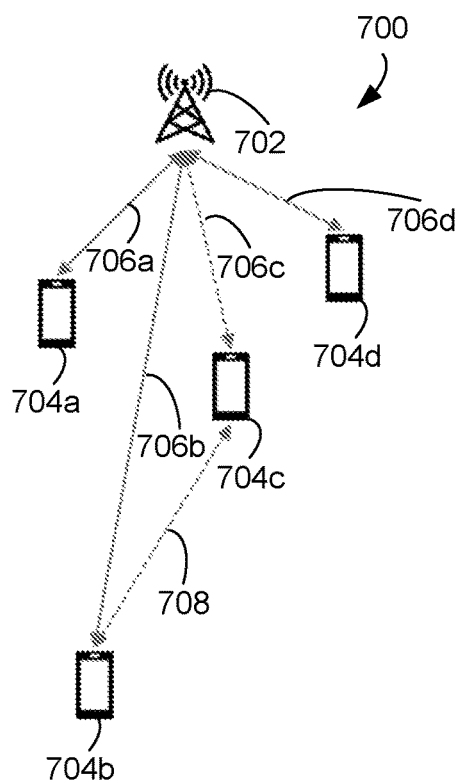
FIG. 7 is a diagram illustrating an example of a cellular communication system, in accordance with aspects of the present disclosure.

In some cases, two or more UEs may directly communicate with each other via a channel (e.g., link) such as a sidelink channel. In such cases, one of the UEs may act as a relay to improve communication between another UE (e.g., a remote UE) and the base station. FIG. 7 illustrates an example of a cellular communication system 700, in accordance with aspects of the present disclosure. In the example of FIG. 7, a base station 702 may directly communicate with each UE 704a, 704b, 704c, 704d via respective communication channels 706a, 706b, 706c, 706d.

Additionally, as shown in FIG. 7, a first UE 704c may act as a relay for a second UE 704b. For example, the first UE 704c may act as a relay for a second UE 704b when the second UE 704b has limited coverage. In one example, the second UE 704b may be located in a building or underground, thereby limiting the second UE's coverage. Based on the limited coverage, the second UE 704b may have difficulty communicating over a communication channel 706b between the second UE 704b and the base station 702. In contrast, as an example, the first UE 704c may be in a better position to communicate with the base station 702 in comparison to the second UE 704b. In the example of FIG. 7, the first UE 704c is located between the base station 702 and the second UE 704b. Additionally, a quality of the communication channel 706c between the first UE 704c and the base station 702 may be better than a quality of the communication channel 706b between the second UE 704b and the base station 702. The first UE 704c and the second UE 704b may communicate with each other via a channel 708, such as a sidelink channel or another type of peer-to-peer channel.

In some configurations, the base station 702 schedules the second UE 704b to transmit uplink data via an uplink grant while the first UE 704c acts as a relay. In this configuration, both the first and second UEs 704c, 704b are in a connected mode, such as a radio resource configuration (RRC) connected mode. As described, the first UE 704c and the second UE 704b may communicate with each other via a channel 708, such as a sidelink channel. Additionally, or alternatively, the first UE 704c may monitor or overhear transmissions of the second UE 704b. The first UE 704c may be an example of a receiver UE 502 or RSU 510 as described with respect to FIG. 5. The second UE 704b may be an example of a transmitter UE 504 as described with respect to FIG. 5.

Additionally, the base station 702 schedules the first UE 704c to transmit uplink data via an uplink grant. The first UE 704c may use the uplink resources indicated in the uplink grant to transmit data received from the second UE 704b. The first UE 704c may receive data from the second UE 704b prior to receiving the uplink grant. The uplink grant may be a dynamic grant or a configured grant.

In some configurations, the uplink transmission from the first UE 704c to the base station 702 includes uplink control information (UCI) to identify whether a payload of the uplink transmission originated from the first UE 704c or the second UE 704b. The first UE 704c may determine whether the payload includes data (e.g., second data) received from the second UE 704b or data (e.g., first data) generated at the first UE 704c based on a priority of the first data and the second data, an existence of the first data (e.g., whether the first UE 704c generated data), or a base station configuration. The second UE 704b may indicate the priority of the second data to the first UE 704c.

For ease of explanation, the first UE 704c may be referred to as a relay UE and the second UE 704b may be referred to as a remote UE or relayed UE. As described, the relay UE may relay or retransmit the data received from the remote UE. The data generated by the relay UE may be referred to as relay data (e.g., first data) and the data generated by the remote UE may be referred to as remote data (e.g., second data).

Figure 8:
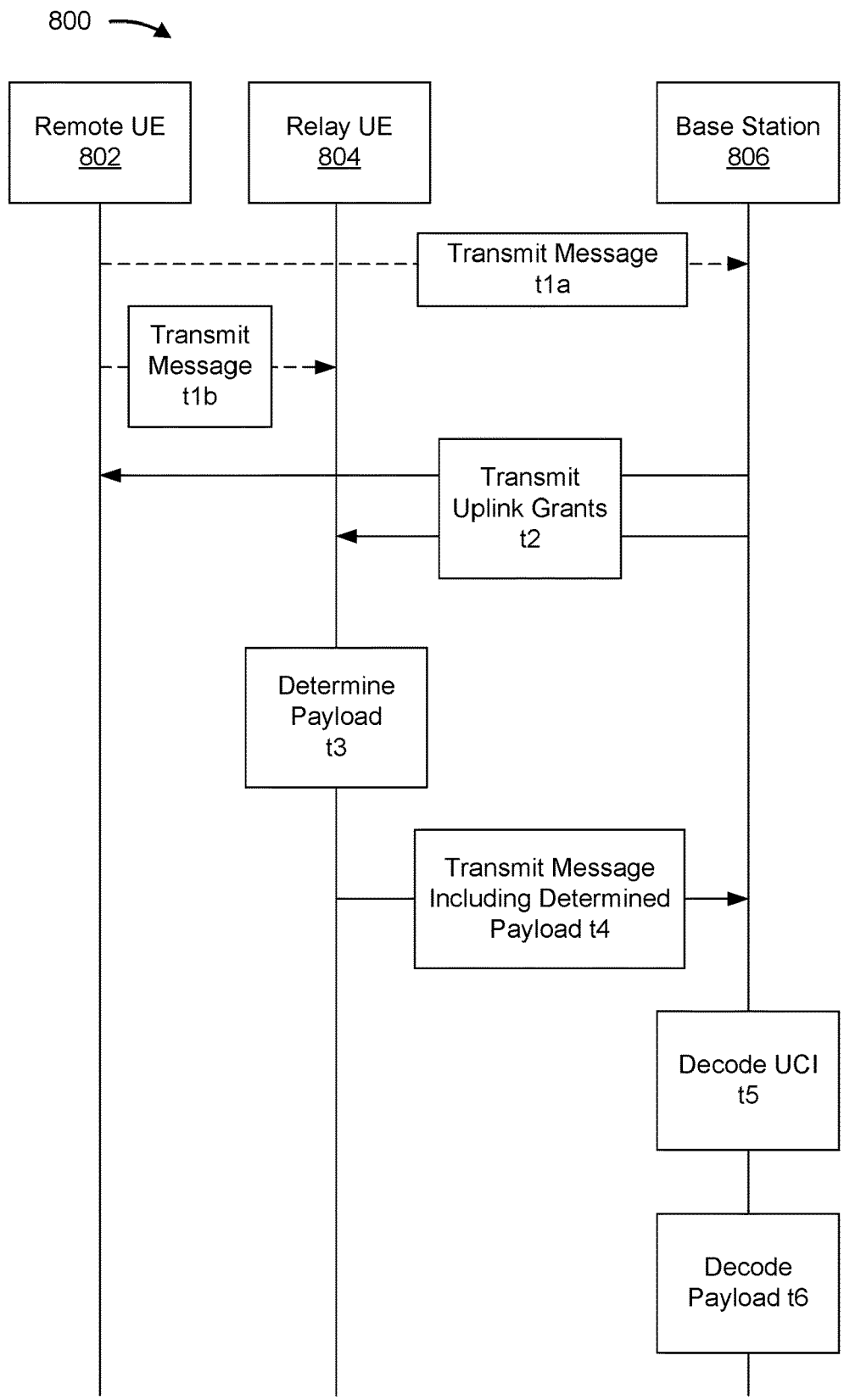
FIG. 8 is a timing diagram illustrating an example of user equipment (UE) assisted transmission, in accordance with aspects of the present disclosure.

FIG. 8 is a timing diagram 800 illustrating an example of user equipment (UE) assisted transmission, in accordance with aspects of the present disclosure. In the example of FIG. 8, a relay UE 804 and a remote UE 802 communicate with a base station 806. The relay UE 804 may be an example of the first UE 704c described in FIG. 7, the remote UE 802 may be an example of the second UE 704*b* as described with respect to FIG. 7, and the base station 806 may be an example of the base station 702 described with respect to FIG. 7.

In optional configurations, at t1*a*, the remote UE 802 transmits a message to the base station 806, the message may include a data message and/or control information. The data message and/or control information transmitted from the remote UE 802 may be referred to as remote data. Alternatively, in optional configurations, at time t1*b*, the remote UE 802 transmits the message to the relay UE 804 via a channel established between the remote UE 802 and the relay UE 804. The channel may be a sidelink channel.

At time t2, the base station 806 transmits uplink grants to the relay UE 804 and the remote UE 802. The uplink grants may be configured grants or dynamic grants. The uplink grants identify uplink resources for transmissions from the UEs 802, 804 to the base station 806. At time t3, the relay UE 804 determines a payload for a transmission to the base station 806 using the uplink resources received in the uplink grant. The payload may include relay data generated at the relay UE 804 or the remote data from the remote UE 802. The relay UE 804 may receive the remote data directly from the remote UE 802 (time t1*b*) or the relay UE 804 may obtain the remote data by overhearing or monitoring a transmission between the remote UE 802 and the base station 806 (time t1*a*).

At time t4, the relay UE 804 transmits a message including the determined payload and uplink control information (UCI) to the base station 806. The UCI may include hybrid automatic repeat request (HARQ) control information, such as a HARQ process identification (ID), a redundancy version identifier (RVID), and a new data indicator (NDI). The UCI may also include a user equipment-identification (UE-ID) identifying a source of data in the payload.

At time t5, the base station 806 decodes the UCI included in the message transmitted by the relay UE 804 at time t4. The data in the payload may be remote data generated by the remote UE 802 or relay data. As described, the UCI may indicate a source of the data in the payload. Therefore, the base station 806 may decode the UCI prior to decoding the payload. As described below, the base station 806 may rate match a transport block and/or soft combine the data in the payload based on the source of the data (e.g., remote UE 802 or relay UE 804).

As shown in FIG. 8, at time t6, the base station 806 decodes the payload received from the relay UE 804. The payload may be decoded based on uplink resources assigned to the relay UE 804 with the uplink grant transmitted at time t2.

As described, the UCI may include HARQ control information. In some cases, the HARQ control information, such as a HARQ process identification (ID), a redundancy version identifier (RVID), and a new data indicator (NDI) is included in a configured grant-uplink control information (CG-UCI) field configured by a new radio unlicensed spectrum (NR-U) configured grant-uplink (CG-UL) message. According to aspects of the present disclosure, the HARQ control information may assist the base station in determining a source of data included in a payload.

Additionally, as described, a user equipment-identification (UE-ID) may also assist the base station in determining the source of data included in the payload. In long-term evolution-further enhanced licensed-assisted access (LTE-feLAA), the CG-UCI also includes a UE-ID for identifying a transmitting UE, such that a base station may identify a node transmitting over the CG-UL resource. The base station may over-provision CG-UL resources, therefore, the base station may distinguish transmitting UEs based on the UE-ID.

In some configurations, the UCI is added to a physical uplink shared channel (PUSCH) transmission of the relay UE. For example, in FIG. 8, the transmission from the relay UE 804 to the base station 806, at time t4, may be a PUSCH transmission. The physical uplink shared channel may be scheduled with a configured grant or a dynamic grant. In these examples, the UCI includes the UE-ID. The UE-ID may be a cell radio network temporary identifier (C-RNTI) or a pre-configured ID. When the relay UE transmits its own data (e.g., relay data), the UE-ID identifies the relay UE. When the relay UE retransmits or relays the remote UE's data (e.g., remote data), the UE-ID identifies the remote UE.

The hybrid automatic repeat request (HARQ) process control information may be dependent on whether the relay UE is transmitting the relay data or the remote data. Additionally, the HARQ process control information may be dependent on whether the uplink grant received at the relay UE was a configured grant or a dynamic grant.

In some configurations, when the relay UE transmits the relay data using uplink resources provided in a configured grant, the HARQ process ID, redundancy version identifier (RVID), and new data indicator (NDI) correspond to the relay data. In other configurations, when the relay UE transmits the relay data using uplink resources provided in a dynamic grant, the HARQ process ID, RVID, and NDI may be zero or may repeat the information provided by the base station.

In still other configurations, when the relay UE transmits the remote data using uplink resources provided in a configured grant or a dynamic grant received at the relay UE, the HARQ process ID, NDI, and RVID may correspond to the remote data. In these configurations, the remote UE may provide the HARQ process ID and NDI to the relay UE. The RVID may be generated by the relay UE or received from the remote UE.

As described, a channel may be established between the relay UE and the remote UE. In some configurations, the channel is a dedicated sidelink channel. Alternatively, the relay UE may monitor uplink transmissions from the remote UE to the base station. In this example, the relay UE monitors the remote UE's uplink transmissions when the relay UE is operating in a retransmission mode. That is, in the retransmission mode, the remote UE transmits to the base station and the relay UE assists the remote UE by retransmitting the remote UE's transmission. In some configurations, the relay UE retransmits the remote UE's transmissions when an initial transmission from the remote UE to the base station was unsuccessful. In one example, the base station may transmit downlink control information (DCI) identifying remote UE uplink transmissions that may need assistance. The uplink transmissions may be identified based on a HARQ process ID.

In the case of the relay mode, the remote UE does not transmit data (e.g., data messages and/or control information) directly to the base station. Rather, the remote UE transmits data to the relay UE, which relays the received data to the base station. In some examples, the uplink channel between the remote UE and the base station may be poor due to interference, poor coverage, and/or other reasons. The base station may be aware of the poor quality. Therefore, the base station does not request the remote UE to perform an initial transmission to the base station. Rather, the base station may trigger the remote UE to transmit data to another UE, such as the relay UE, or a set of UEs. In these examples, a distance between the relay UE and the remote UE may be less than a distance between the base station and the remote UE. Therefore, a data rate for transmissions between the remote UE and the relay UE may be greater (e.g., larger transport block (TB)) in comparison to transmissions between the remote UE and the base station. The base station may trigger the relay UE to relay the information back to the base station. The trigger may be transmitted via downlink control information (DCI). In these configurations, the base station may configure the remote UE to select a transport block size (TBS). The transport block size may be indicated in the UCI included in the relay UE's transmissions.

In some implementations, if the payload received from the relay UE includes the remote data, the base station soft combines the remote data with log-likelihood ratios (LLRs) directly received from the remote UE for a same HARQ process ID and NDI. The base station may perform the soft combine if the remote data is relayed or retransmitted.

The base station may be aware that the payload is received from the relay UE. That is, the base station may be aware that the first UE is operating as a relay node. Therefore, for determining a transport block size (TBS), resources assigned to the relay UE may not be the same as resources assigned to the remote UE.

If the payload includes the relay data (e.g., data generated by the relay UE), the TBS may be determined according to conventional methods (e.g., based on a resource assignment). Alternatively, if the payload includes the remote data, the base station identifies the TBS from the original assignment to the remote UE for the HARQ process ID with the given NDI. The TBS is derived from the original grant, or configured grant, to the remote UE for the HARQ process ID. Still, the modulation coding scheme (MCS) may be configured based on an uplink grant for the relay UE. Therefore, the transport block for the remote UE is rate matched with the relay UE's modulation order, rank, and/or demodulation reference signal (DMRS) pattern.

In some configurations, the base station advertises (e.g., broadcasts) the configured grant (CG) configuration in the neighborhood. The relay UE may use the advertised configured grant (CG) configuration to decode packets transmitted from other UEs served by the base station. Additionally, based on the advertised configured grant (CG) configuration, the remote UE may be aware of the relay UE's configured grant (CG) resources. Therefore, the remote UE may transmit packets to the relay UE, for example, through a sidelink transmission.

According to aspects of the present disclosure, the base station may configure potential relay nodes for the remote UE. The remote UE may transmit data to one or more relay nodes included in the list of potential relay nodes. The base station may rank the potential relay nodes. For example, the potential relay nodes may be ranked based on uplink resource availability. Additionally, or alternatively, the base station may indicate uplink channel quality of the potential relay nodes. The remote UE may select a relay node from the list of potential relay nodes based on the quality of the uplink channel to the relay node, availability of uplink resources from the relay node, and/or a quality of the uplink channel from the relay node to the base station.

As indicated above, FIGS. 6, 7, and 8 are provided as examples. Other examples may differ from what is described with respect to FIGS. 6, 7, and 8.

Figure 9:
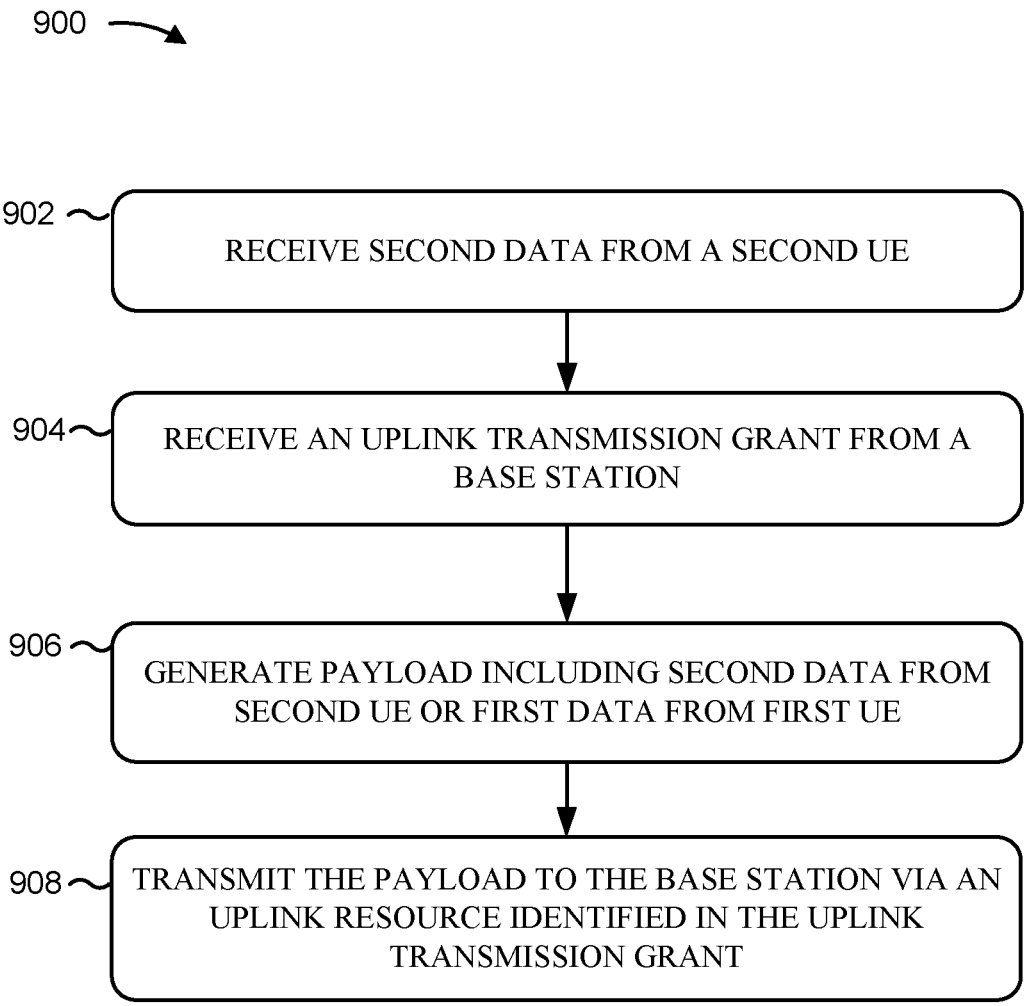
FIG. 9 is a flow diagram illustrating an example process performed, for example, by a user equipment, in accordance with various aspects of the present disclosure.

FIG. 9 is a flow diagram illustrating an example process 900 performed, for example, by a user equipment, in accordance with various aspects of the present disclosure. The example process 900 is an example of UE assisted uplink transmissions. As shown in FIG. 9, in some aspects, the process 900 may include receiving second data from a second UE (block 902). For example, the UE (e.g., using the antenna 352, DEMOD/MOD 354, receive processor 356, controller/processor 359, and/or memory 360) may receive second data from a second UE. As seen in FIG. 8, at time t1b, the remote UE 802 transmits a message to the relay UE 804 via a channel established between the remote UE 802 and the relay UE 804. The channel may be a sidelink channel.

The process 900 may include receiving an uplink transmission grant from a base station (block 904). For example, the UE (e.g., using the antenna 352, DEMOD/MOD 354, receive processor 356, controller/processor 359, and/or memory 360) may receive an uplink transmission grant. The uplink grants may be configured grants or dynamic grants. The uplink grants identify uplink resources for transmissions from the UE to the base station.

In some aspects, the process 900 may include generating a payload comprising the second data from the second UE or first data from the first UE (block 906). For example, the UE (e.g., using the controller/processor 359, and/or memory 360) may generate the payload. As seen in FIG. 8, at time t3, the relay UE 804 determines a payload for a transmission to the base station 806 using the uplink resources received in the uplink grant. The payload may include relay data generated at the relay UE 804 or the remote data from the remote UE 802. The relay UE 804 may receive the remote data directly from the remote UE 802 (time t1b) or the relay UE 804 may obtain the remote data by overhearing or monitoring a transmission between the remote UE 802 and the base station 806 (time t1a).

In some aspects, the process 900 may include transmitting the payload to the base station via an uplink resource identified in the uplink transmission grant (block 908). For example, the UE (e.g., using the antenna 352, DEMOD/MOD 354, the transmit processor 368, controller/processor 359, and/or memory 360) may transmit the payload. As seen in FIG. 8, at time t4, the relay UE 804 transmits a message including the determined payload and uplink control information (UCI) to the base station 806. The UCI may include hybrid automatic repeat request (HARQ) control information, such as a HARQ process identification (ID), a redundancy version identifier (RVID), and a new data indicator (NDI). The UCI may also include a user equipment-identification (UE-ID) identifying a source of data in the payload.

Figure 10:
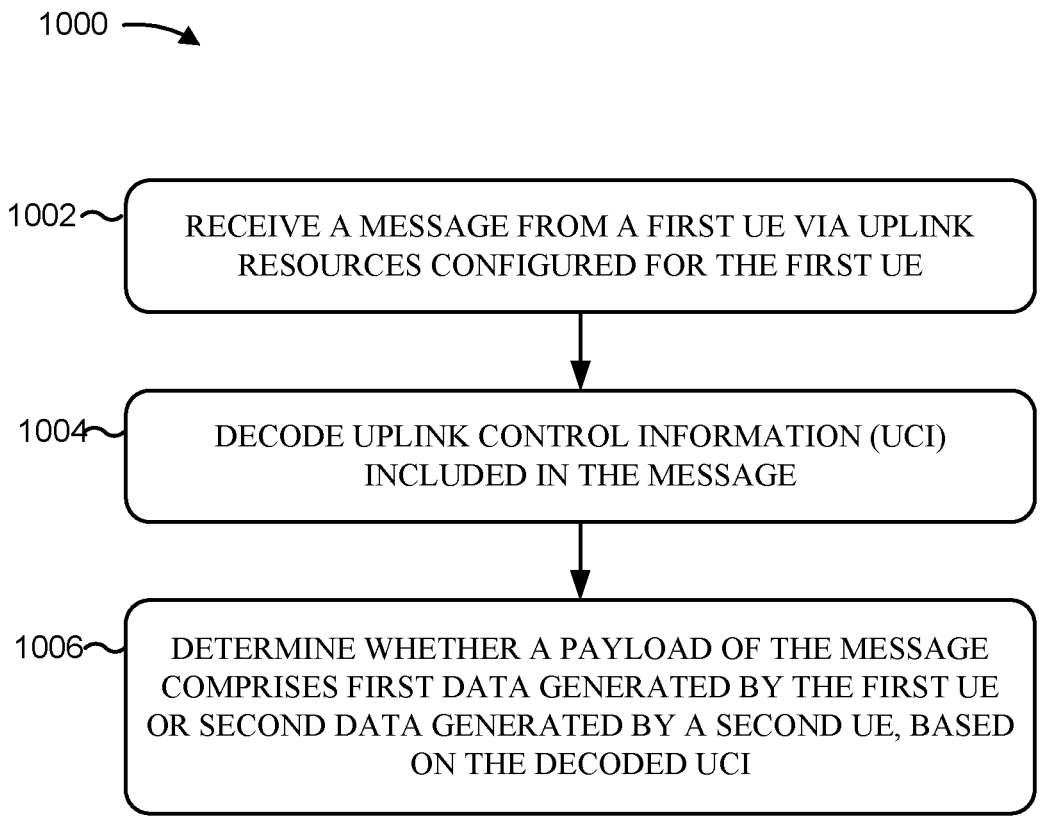
FIG. 10 is a flow diagram illustrating an example process performed, for example, by a base station, in accordance with various aspects of the present disclosure.

FIG. 10 is a flow diagram illustrating an example process 1000 performed, for example, by a base station, in accordance with various aspects of the present disclosure. The example process 1000 is an example of receiving UE assisted uplink transmissions. As shown in FIG. 10, in some aspects, the process 1000 may include receiving a message from a first UE via uplink resources configured for the first UE (block 1002). For example, the base station (e.g., using the antenna 320, receive processor 370, controller/processor 375, and/or memory 376) may receive a message from a first UE via uplink resources configured for the first UE. The message may include a payload and uplink control information (UCI)

In some aspects, the process 1000 may include decoding uplink control information (UCI) included in the message (block 1004). For example, the base station (e.g., using the antenna 320, receive processor 370, controller/processor 375, and/or memory 376) may decode UCI included in the message. As seen in FIG. 8, at time t5, the base station 806 decodes the UCI included in the message transmitted by the relay UE 804 at time t4. The data in the payload may be remote data generated by the remote UE 802 or relay data. As described, the UCI may indicate a source of the data in the payload.

In some aspects, the process 1000 may include determining whether a payload of the message comprises first data generated by the first UE or second data generated by a second UE, based on the decoded UCI (block 1006). For example, the base station (e.g., using the controller/processor 375, and/or memory 376) may determine whether a payload of the message comprises first data generated by the first UE or second data generated by a second UE, based on the decoded UCI. The data in the payload may be remote data generated by the remote UE or relay data. As described, the UCI may indicate a source of the data in the payload. The UCI may include HARQ control information. In some cases, the HARQ control information, such as such as a HARQ process identification (ID), a redundancy version identifier (RVID), and a new data indicator (NDI) is included in a configured grant-uplink control information (CG-UCI) field configured by a new radio unlicensed spectrum (NR-U) configured grant-uplink (CG-UL) message. According to aspects of the present disclosure, the HARQ control information may assist the base station in determining a source of data included in a payload.

The following provides an overview of aspects of the present disclosure:

Aspect 1: A method of wireless communication performed by a first user equipment (UE), comprising receiving second data from a second UE, and receiving, from a base station, an uplink transmission grant. The method further comprises generating a payload comprising the second data from the second UE or first data from the first UE and transmitting the payload to the base station via an uplink resource identified in the uplink transmission grant.

Aspect 2: The method of aspect 1, wherein the uplink transmission grant is a dynamic grant or a configured grant.

Aspect 3: The method of aspect 1 or 2, further comprising transmitting a message comprising uplink control information (UCI) identifying a source of the payload.

Aspect 4: The method of any aspects 1 through 3, wherein the UCI comprises a UE-identifier (ID) and hybrid automatic repeat request (HARQ) control information comprising an ID, a new data indicator (NDI), and a redundancy version identifier (RVID).

Aspect 5: The method of any aspects 1 through 4, wherein the UE-ID comprises a cell radio network temporary identifier (C-RNTI) or a pre-configured ID. The UE-ID further comprises a first UE ID when the payload comprises the first data a second UE ID when the payload comprises the second data.

Aspect 6: The method of any aspects 1 through 5, wherein the HARQ control information is based on the first data when the payload comprises the first data and the uplink grant is a configured grant.

Aspect 7: The method of any aspects 1 through 6, wherein the HARQ control information is zero or repeated from information provided by the base station when the payload comprises the first data and the uplink grant is a dynamic grant.

Aspect 8: The method of any aspects 1 through 7, wherein the HARQ control information is based on the second data when the payload comprises the second data.

Aspect 9: The method of any aspects 1 through 8, further comprising receiving the ID and the NDI from the second UE, the RVID being generated at the first UE or received from the second UE.

Aspect 10: The method of any aspects 1 through 9, further comprising determining whether the payload comprises the first data or the second data based on a priority of the first data, a priority of the second data, or a base station configuration.

Aspect 11: The method of any aspects 1 through 10, further comprising receiving the priority of the second data from the second UE.

Aspect 12: The method of any aspects 1 through 11, further comprising receiving the second data via a dedicated sidelink or based on monitoring a transmission by the second UE.

Aspect 13: The method of any aspects 1 through 12, wherein the first UE operates in a retransmission mode. The method further comprises transmitting the payload comprising the second data when an initial transmission from the second UE to the base station is determined to be unsuccessful.

Aspect 14: The method of any aspects 1 through 13, wherein the first UE operates in a relay mode, and the method further comprises transmitting the payload comprising the second data in response to a trigger received from the base station.

Aspect 15: An apparatus for wireless communications performed by a first user equipment (UE), comprising a processor, memory coupled with the processor, and instructions stored in the memory and operable. When the instructions are executed by the processor, the apparatus receives second data from a second UE. The apparatus also receives, from a base station, an uplink transmission grant, generates a payload comprising the second data from the second UE or first data from the first UE, and transmits the payload to the base station via an uplink resource identified in the uplink transmission grant.

Aspect 16: The apparatus of aspect 15, wherein the uplink transmission grant is a dynamic grant or a configured grant.

Aspect 17: The apparatus of aspect 15 or 16, wherein the instructions further cause the apparatus to transmit a message comprising uplink control information (UCI) identifying a source of the payload.

Aspect 18: The apparatus of any aspects 15 through 17, wherein the UCI comprises a UE-identifier (ID) and hybrid automatic repeat request (HARQ) control information comprising an ID, a new data indicator (NDI), and a redundancy version identifier (RVID).

Aspect 19: A method for wireless communication performed by a base station, comprising receiving a message from a first user equipment (UE) via uplink resources dynamically granted or configured for the first UE, decoding uplink control information (UCI) included in the message, and determining whether a payload of the message comprises first data generated by the first UE or second data generated by a second UE, based on the decoded UCI.

Aspect 20: The method of aspect 19, further comprising soft combining the second data with third data received from the second UE in response to the second data and the third data having a same UE identifier (ID), a same hybrid automatic repeat request (HARQ) ID and a same new data indicator (NDI).

Aspect 21: The method of aspect 19 or 20, further comprising determining a transport block size (TBS) for the second data based on a TBS of a grant transmitted to the second UE for a hybrid automatic repeat request (HARQ) identifier (ID) of the second data when the payload comprises the second data.

Aspect 22: The method of any aspects 19 through 21, further comprising rate matching the TBS with a modulation and coding scheme (MCS) assigned to the uplink resources configured for the first UE.

Aspect 23: The method of any aspects 19 through 22, further comprising advertising a configured grant for the first UE to the second UE.

Aspect 24: The method of any aspects 19 through 23, further comprising transmitting a relay node configuration to the second UE, the relay node configuration comprising at least one of a list of potential relay nodes, a priority of the potential relay nodes, resource availability of the potential relay nodes, or a link quality of the potential relay nodes.

Aspect 25: An apparatus for wireless communications performed by a base station, comprising a processor, memory coupled with the processor, and instructions stored in the memory and operable. When the instructions are executed by the processor, the apparatus receives a message from a first user equipment (UE) via uplink resources dynamically granted or configured for the first UE, to decode uplink control information (UCI) included in the message, and determines whether a payload of the message comprises first data generated by the first UE or second data generated by a second UE, based on the decoded UCI.

Aspect 26: The apparatus of aspect 25, wherein the instructions further cause the apparatus to soft combine the second data with third data received from the second UE when the second data and the third data have a same UE identifier (ID), a same hybrid automatic repeat request (HARQ) ID and a same new data indicator (NDI).

Aspect 27: The apparatus of aspect 25 or 26, wherein the instructions further cause the apparatus to determine a transport block size (TBS) for the second data based on a TBS of a grant transmitted to the second UE for a hybrid automatic repeat request (HARQ) identifier (ID) of the second data when the payload comprises the second data.

Aspect 28: The apparatus of any aspects 25 through 27, wherein the instructions further cause the apparatus to rate match the TBS with a modulation and coding scheme (MCS) assigned to the uplink resources configured for the first UE.

Aspect 29: The apparatus of any aspects 25 through 28, wherein the instructions further cause the apparatus to advertise a configured grant for the first UE to the second UE.

Aspect 30: The apparatus of any aspects 25 through 29, wherein the instructions further cause the apparatus to transmit a relay node configuration to the second UE, the relay node configuration comprising at least one of a list of potential relay nodes, a priority of the potential relay nodes, resource availability of the potential relay nodes, or a link quality of the potential relay nodes.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first user equipment (UE), comprising:
receiving second data from a second UE;
receiving, from a base station, an uplink transmission grant of an uplink resource for the first UE to transmit first data generated by the first UE;
determining which one of the first data or second data to transmit in the uplink resource identified in the uplink transmission grant based on a priority of the first data or a priority of the second data;
generating a payload comprising the second data from the second UE based on the priority of the second data;
transmitting the payload to the base station via the uplink resource identified in the uplink transmission grant; and
transmitting an uplink control information (UCI) message identifying a source of the payload as the second UE, the source being determined based on the priority of the second data.

2. The method of claim 1, in which the uplink transmission grant is a dynamic grant or a configured grant.

3. The method of claim 1, in which the UCI comprises a UE-identifier (ID) and hybrid automatic repeat request (HARQ) control information comprising an ID, a new data indicator (NDI), and a redundancy version identifier (RVID).

4. The method of claim 3, in which:
the UE-ID comprises a cell radio network temporary identifier (C-RNTI) or a pre-configured ID;
the UE-ID comprises a first UE ID when the payload comprises the first data; and
the UE-ID comprises a second UE ID when the payload comprises the second data.

5. The method of claim 3, in which the HARQ control information is based on the first data when the payload comprises the first data and the uplink grant is a configured grant.

6. The method of claim 3, in which the HARQ control information is zero or repeated from information provided by the base station when the payload comprises the first data and the uplink grant is a dynamic grant.

7. The method of claim 3, in which the HARQ control information is based on the second data when the payload comprises the second data.

8. The method of claim 7, further comprising receiving the ID and the NDI from the second UE, the RVID being generated at the first UE or received from the second UE.

9. The method of claim 1, further comprising determining whether the payload comprises the first data or the second data based on a base station configuration.

10. The method of claim 9, further comprising receiving the priority of the second data from the second UE.

11. The method of claim 1, further comprising receiving the second data via a dedicated sidelink or based on monitoring a transmission by the second UE.

12. The method of claim 1, in which the first UE operates in a retransmission mode, and the method further comprises:
transmitting the payload comprising the second data when an initial transmission from the second UE to the base station is determined to be unsuccessful.

13. The method of claim 1, in which the first UE operates in a relay mode, and the method further comprises transmitting the payload comprising the second data in response to a trigger received from the base station.

14. An apparatus for wireless communications performed by a first user equipment (UE), comprising:
a processor,
memory coupled with the processor; and
instructions stored in the memory and operable, when executed by the processor, to cause the apparatus to:
receive second data from a second UE;
receive, from a base station, an uplink transmission grant of an uplink resource for the first UE to transmit first data generated by first UE;
determine which one of the first data or second data to transmit in the uplink resource identified in the uplink transmission grant based on a priority of the first data or a priority of the second data;
generate a payload comprising the second data from the second UE based on the priority of the second data;
transmit the payload to the base station via the uplink resource identified in the uplink transmission grant; and
transmit an uplink control information (UCI) message identifying a source of the payload as the second UE, the source being determined based on the priority of the second data.

15. The apparatus of claim 14, in which the uplink transmission grant is a dynamic grant or a configured grant.

16. The apparatus of claim 14, in which the UCI comprises a UE-identifier (ID) and hybrid automatic repeat request (HARQ) control information comprising an ID, a new data indicator (NDI), and a redundancy version identifier (RVID).

17. A method for wireless communication performed by a base station, comprising:
transmitting an uplink grant to a first user equipment (UE) to enable transmitting of first data generated by the first UE;
triggering a second UE to transmit second data to the first UE;
triggering the first UE to relay the second data from the second UE;
receiving a message from the first UE via uplink resources scheduled by the uplink grant;
decoding uplink control information (UCI) included in the message;
determining a payload of the message comprises the second data generated by the second UE, based on the decoded UCI; and
combining the second data with third data received directly from the second UE in response to the second data and the third data having a same UE identifier (ID), a same hybrid automatic repeat request (HARQ) ID and a same new data indicator (NDI).

18. The method of claim 17, further comprising determining a transport block size (TBS) for the second data based on a TBS of a grant transmitted to the second UE for a hybrid automatic repeat request (HARM) identifier (ID) of the second data when the payload comprises the second data.

19. The method of claim 18, further comprising rate matching the TBS with a modulation and coding scheme (MCS) assigned to the uplink resources configured for the first UE.

20. The method of claim 17, further comprising advertising a configured grant for the first UE to the second UE.

21. The method of claim 17, further comprising transmitting a relay node configuration to the second UE, the relay node configuration comprising at least one of a list of potential relay nodes, a priority of the potential relay nodes, resource availability of the potential relay nodes, or a link quality of the potential relay nodes.

22. An apparatus for wireless communications performed by a base station, comprising:
a processor,
memory coupled with the processor; and
instructions stored in the memory and operable, when executed by the processor, to cause the apparatus to:
transmit an uplink grant to a first user equipment (UE) to enable transmitting of first data generated by the first UE;
trigger a second UE to transmit second data to the first UE;
trigger the first UE to relay the second data from the second UE;
receive a message from the first UE via uplink resources scheduled by the uplink grant;
decode uplink control information (UCI) included in the message;
determine a payload of the message comprises the second data generated by the second UE, based on the decoded UCI; and
combine the second data with third data received directly from the second UE in response to the second data and the third data having a same UE identifier (ID), a same hybrid automatic repeat request (HARQ) ID and a same new data indicator (NDI).

23. The apparatus of claim 22, in which the instructions further cause the apparatus to determine a transport block size (TBS) for the second data based on a TBS of a grant transmitted to the second UE for a hybrid automatic repeat request (HARM) identifier (ID) of the second data when the payload comprises the second data.

24. The apparatus of claim 23, in which the instructions further cause the apparatus to rate match the TBS with a modulation and coding scheme (MCS) assigned to the uplink resources configured for the first UE.

25. The apparatus of claim 22, in which the instructions further cause the apparatus to advertise a configured grant for the first UE to the second UE.

26. The apparatus of claim 22, in which the instructions further cause the apparatus to transmit a relay node configuration to the second UE, the relay node configuration comprising at least one of a list of potential relay nodes, a priority of the potential relay nodes, resource availability of the potential relay nodes, or a link quality of the potential relay nodes.

* * * * *